(12) United States Patent
Jun et al.

(10) Patent No.: US 11,650,946 B2
(45) Date of Patent: May 16, 2023

(54) ELECTRONIC DEVICE AND METHOD FOR PROCESSING SENSOR DATA OF ELECTRONIC DEVICE

(71) Applicant: Samsung Electronics Co., Ltd., Suwon-si (KR)

(72) Inventors: Intae Jun, Suwon-si (KR); Eunki Na, Suwon-si (KR); Cheoleun Heo, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/451,113

(22) Filed: Oct. 15, 2021

(65) Prior Publication Data
US 2022/0382694 A1    Dec. 1, 2022

Related U.S. Application Data

(63) Continuation of application No. PCT/KR2021/012273, filed on Sep. 9, 2021.

(30) Foreign Application Priority Data

May 31, 2021 (KR) .................. 10-2021-0070157

(51) Int. Cl.
*G06F 13/24* (2006.01)

(52) U.S. Cl.
CPC ...... *G06F 13/24* (2013.01); *G06F 2213/2408* (2013.01)

(58) Field of Classification Search
CPC .................. G06F 13/24; G06F 2213/2408
See application file for complete search history.

(56) References Cited

U.S. PATENT DOCUMENTS 8,718,938 B2   5/2014 Wolf et al.
8,959,270 B2   2/2015 de Cesare et al.
(Continued)

FOREIGN PATENT DOCUMENTS

KR   10-2006-0038465   5/2006
KR   10-0888427       3/2009
(Continued)

OTHER PUBLICATIONS

Search Report and Written Opinion dated Feb. 21, 2022 in counterpart International Patent Application No. PCT/KR2021/012273.

*Primary Examiner* — Glenn A. Auve
(74) *Attorney, Agent, or Firm* — Nixon & Vanderhye, P.C.

(57) ABSTRACT

An electronic device according to various embodiments may comprise: a sensor circuit; a memory storing handler activation information; and a first processor and a second processor operatively connected to the sensor circuit and the memory. The sensor circuit may be configured to transmit an interrupt signal using an interrupt transmission unit comprising circuitry electrically connected to the first processor and the second processor, and configured to transmit sensor data using a sensor data transceiver electrically connected to the first processor and the second processor. The memory may store instructions which, when executed, cause the first processor to: amend or update interrupt handler activation information in the memory in response to a system state of the electronic device, and receive the sensor data from the sensor circuit in response to an interrupt signal transmitted from the sensor circuit based on identifying, using the interrupt handler activation information, that the first processor processes the interrupt of the sensor circuit; wherein the instructions, when executed, cause the second processor to: receive the sensor data from the sensor circuit in response to the interrupt signal transmitted from the sensor circuit (Continued)

based on identifying, using the interrupt handler activation information, that the second processor processes the interrupt of the sensor circuit.

15 Claims, 12 Drawing Sheets

(56) References Cited

U.S. PATENT DOCUMENTS

| | | |
|---|---|---|
| 8,984,199 B2 | 3/2015 | Hammarlund et al. |
| 9,962,082 B2 | 5/2018 | Kim et al. |
| 2010/0185886 A1* | 7/2010 | Mitarai ................. G06F 1/3293 713/323 |
| 2012/0144172 A1* | 6/2012 | de Cesare ............... G06F 13/24 712/244 |
| 2014/0089703 A1* | 3/2014 | Starr ..................... G06F 1/3293 713/323 |
| 2014/0156895 A1* | 6/2014 | Chandrasekaran ... G06F 1/3215 710/260 |
| 2015/0046932 A1 | 2/2015 | Kim et al. |
| 2015/0185054 A1 | 7/2015 | Hesch et al. |
| 2017/0153992 A1* | 6/2017 | Nair ..................... G06F 1/3203 |

FOREIGN PATENT DOCUMENTS

| | | |
|---|---|---|
| KR | 10-2011-0135433 | 12/2011 |
| KR | 10-2012-0063436 | 6/2012 |
| KR | 10-2016-0120721 | 10/2016 |
| KR | 10-2016-0149911 | 12/2016 |

* cited by examiner

| PROCESSING FROM AP TO CP | |
|---|---|
| TIME DELAY IN SLEEP STATE | APPROX. 40 MSEC OR LONGER |
| CONSUMPTION CURRENT WHEN SLEEP STATE GRIP IS RECOGNIZED | 30 ~ 50mA |

320

| PROCESSING FROM SENSOR HUB TO AP | |
|---|---|
| TIME DELAY IN AWAKE STATE | 30 ~ 100 msec |
| CONSUMPTION CURRENT WHEN SLEEP STATE GRIP IS RECOGNIZED | 0.1 MA OR LESS |

FIG. 10

| < EFFECT OF APPLICATION OF DISCLOSURE TO GRIP SENSOR > | | |
|---|---|---|
| | FROM AP TO CP PROCESSING (PREVIOUS) | CP DIRECT PROCESSING |
| TIME DELAY IN SLEEP STATE | APPROX. 40 MSEC OR LONGER | 10 msec |
| CONSUMPTION CURRENT AT MOMENT OF RECOGNITION OF GRIP IN SLEEP STATE | 30 ~ 50mA | NO AP CURRENT CONSUMPTION |

1010

| < EFFECT OF APPLICATION OF DISCLOSURE TO SIX-AXIS SENSOR > | | |
|---|---|---|
| | FROM AP TO CP PROCESSING (PREVIOUS) | CP DIRECT PROCESSING |
| TIME DELAY IN AWAKE STATE | 30 ~ 100 msec | 10 mec |
| CONSUMPTION CURRENT IN SLEEP STATE | 0.1 MA OR LESS | 2-3 MA |

1020

ELECTRONIC DEVICE AND METHOD FOR PROCESSING SENSOR DATA OF ELECTRONIC DEVICE

CROSS-REFERENCE TO RELATED APPLICATIONS

This application is a national stage of International Application No. PCT/KR2021/012273 designating the United States, filed on Sep. 9, 2021, in the Korean Intellectual Property Receiving Office and claiming priority to Korean Patent Application No. 10-2021-0070157, filed on May 31, 2021, in the Korean Intellectual Property Office, the disclosures of which are incorporated by reference herein in their entireties.

BACKGROUND

Field

The disclosure relates to an electronic device and relates to, for example, a device and a method for processing sensor data in an electronic device including multiple processors.

Description of Related Art

With development of information and communication technologies, an electronic device supports various multimedia services and thus, the usage of the electronic device has increased. Due to the increase in data throughput for providing the multiple services, the electronic device may require a processor having a relatively fast processing speed and/or a large capacity memory.

When a single sensor is simultaneously connected to multiple processors and the processors simultaneously receive interrupt signals, operative errors may occur. An interrupt signal may refer, for example, to a signal which requests, from a processor, suspension of a currently processing operation and processing other configured or requested operations. Accordingly, when a single sensor is connected to a single processor and operated, problems of a time delay and inefficient power management may occur.

SUMMARY

Embodiments of the disclosure provide a device and a method for transmitting an interrupt signal and sensor data by simultaneously connecting a sensor to multiple processors in order to reduce a time delay and a consumption current in the process of processing sensor data in an electronic device.

An electronic device according to various example embodiments may include: a sensor circuit, a memory storing handler activation information, and a first processor and a second processor operatively connected to the sensor circuit and the memory. The sensor circuit may be configured to transmit an interrupt signal using an interrupt transmission unit comprising circuitry electrically connected to the first processor and the second processor, and to transmit sensor data using a sensor data transceiver electrically connected to the first processor and the second processor. The memory may store instructions which, when executed, cause the first processor to: amend or update interrupt handler activation information in the memory in response to a system state of the electronic device, and receive the sensor data from the sensor circuit in response to an interrupt signal transmitted from the sensor circuit based on identifying, using the interrupt handler activation information, that the first processor processes the interrupt of the sensor circuit, and cause the second processor to receive the sensor data from the sensor circuit in response to the interrupt signal transmitted from the sensor circuit based on identifying, using the interrupt handler activation information, that the second processor processes the interrupt of the sensor circuit A method for processing sensor data by an electronic device according to various example embodiments may include: identifying a current system state of the electronic device by a first processor, amending the handler activation information in the memory in response to the current system state of the electronic device, recognizing the amended handler activation information by a second processor, and determining whether to receive an interrupt signal transmitted from the sensor circuit by the first processor and the second processor in response to the handler activation information.

According to various example embodiments, a performance deterioration problem due to a time delay can be addressed using an electronic device and a method for processing sensor data. In addition, a consumption current can be minimized and/or reduced, and complex user scenarios can be flexibly responded to through a scheduler.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a table illustrating an example time delay and an example consumption current in the comparative embodiment of FIG. 2;

FIG. 10 is a table illustrating an example effect of application of an electronic device according to various embodiments;

DETAILED DESCRIPTION

Figure 1:
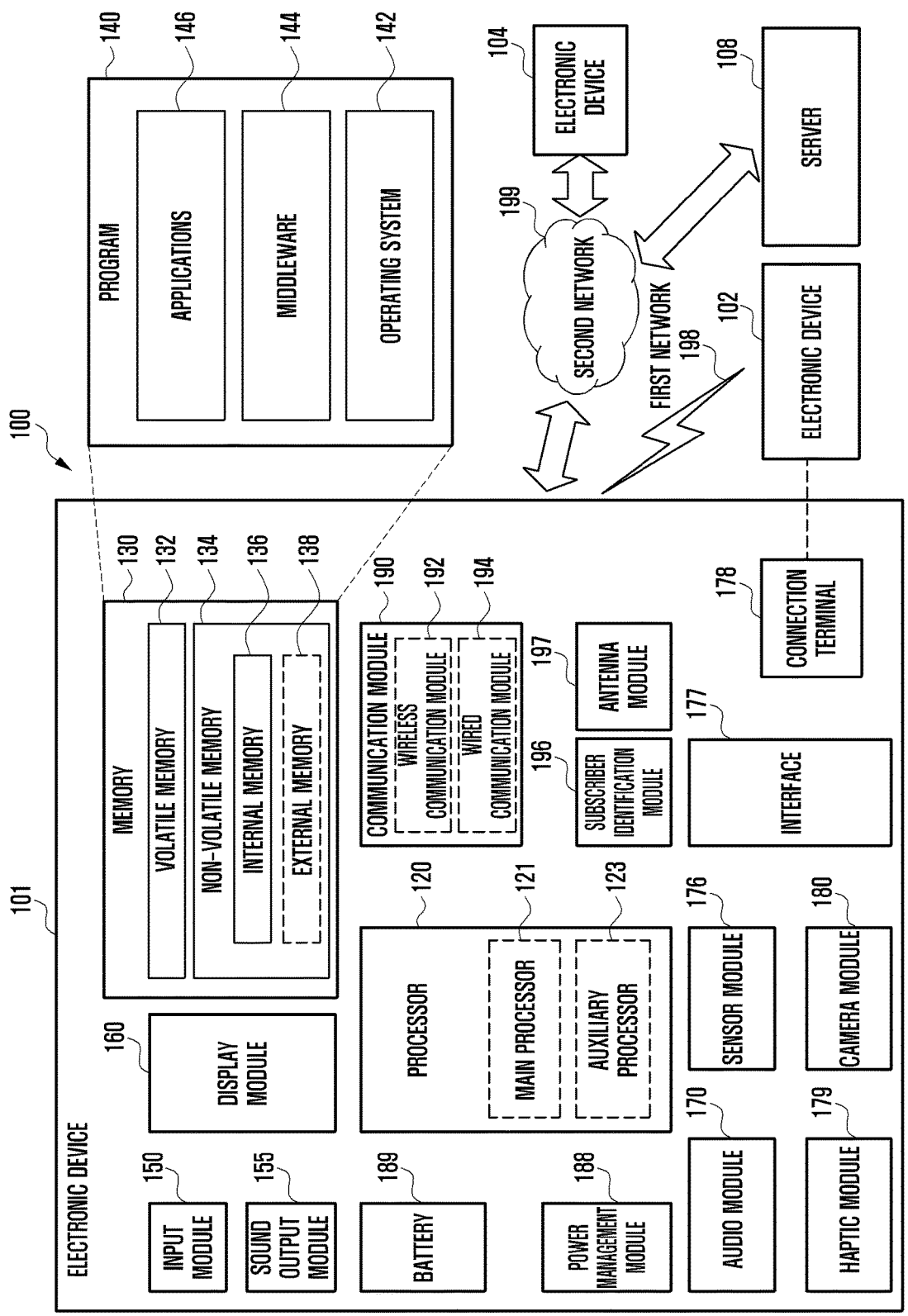
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
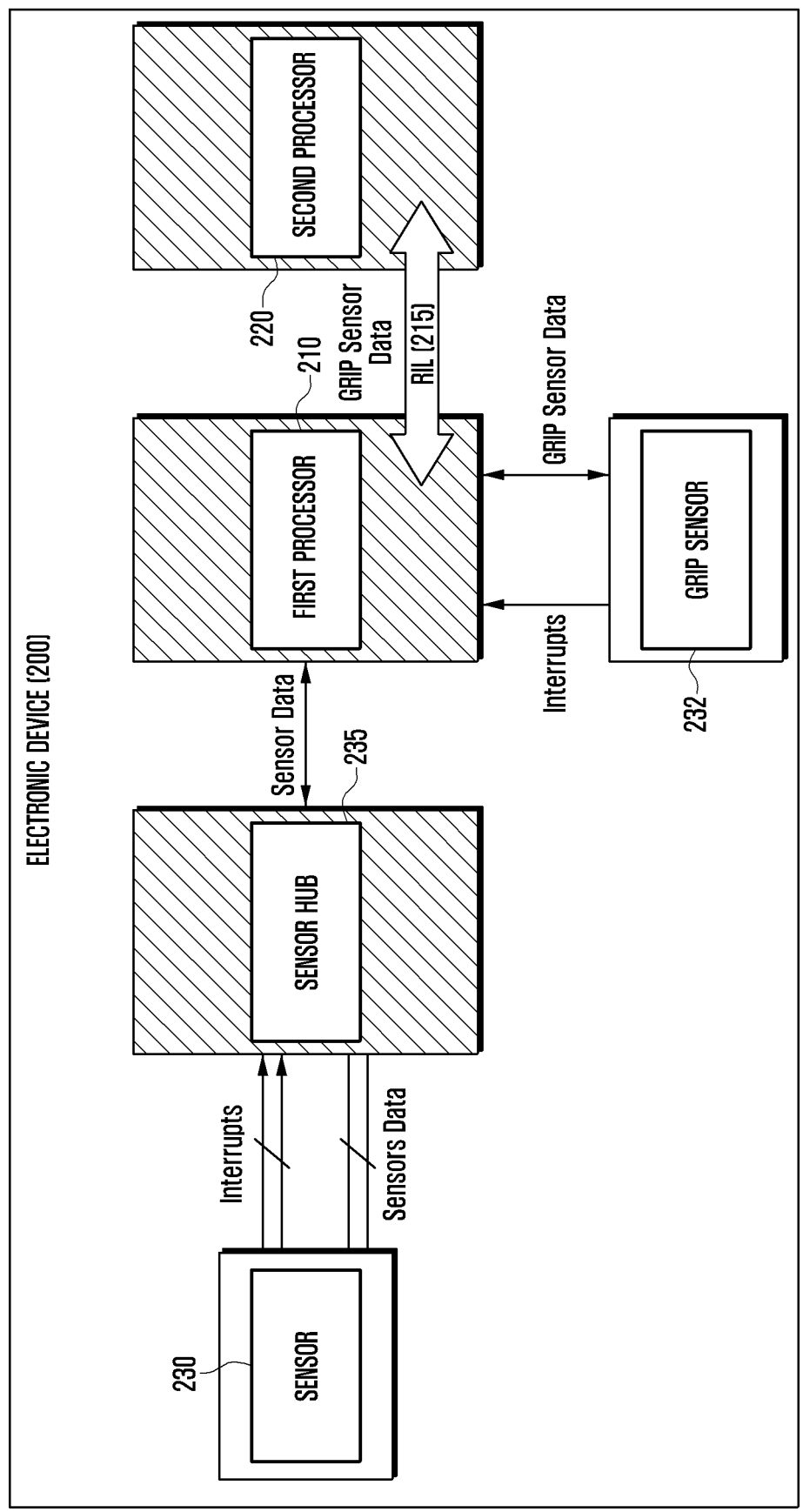
FIG. 2 is a block diagram illustrating an example configuration of an electronic device according to a comparative embodiment.

FIG. 2 is a block diagram illustrating an example configuration of an electronic device according to a comparative example.

An electronic device 200 may include a first processor 210, a second processor 220, a sensor circuit 230, and a sensor hub 235. The first processor 210 and the second processor 220 may be configured to carry out computation or data processing relating to control and/or communication of components of the electronic device 200, and may include at least a part of a configuration and/or a function of the processor 120 of FIG. 1. The first processor 210 and the second processor 220 may be electrically connected to each component (e.g., the sensor circuit 230 or the sensor hub 235) of the electronic device 200.

The sensor circuit 230 may be configured to detect an operational state (e.g., power or temperature) of the electronic device 200 or an environmental state (e.g., a state of a user) external to the electronic device 200, and generate an electrical signal or a data value corresponding to the detected state, and may include at least a part of a configuration and/or a function of the sensor module 176 of FIG. 1. The sensor circuit 230 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, etc.

According to FIG. 2, the first processor 210 may be electrically connected to a grip sensor 232, and the sensor hub 235 may be connected to the sensor circuit 230 (e.g., a geomagnetic field sensor). When the grip sensor 232 transfers an interrupt to the first processor 210, the first processor may request the details (e.g., information on internal capacitance changing when a grip phenomenon occurs) of an actual physical change in the grip sensor 232 through a communication path connected to the grip sensor 232. The interrupt may refer, for example, to a signal which controls a processor (e.g., the first processor 210 or the second processor 220) to stop a currently performing command while a processor (e.g., the first processor 210) performs an operation and to perform other commands or programs. Thereafter, the first processor 210 may transfer information requested from the grip sensor 232 to the second processor 220 using a radio interface layer 215.

In an example the sensor circuit 230 connected to the sensor hub 235 corresponds to a geomagnetic field sensor, the electronic device 200 may operate a compass app in the background when the system thereof is in a deactivated (sleep) state. In this example, when the direction in which the user currently views changes and the geomagnetic field sensor transfers the interrupt to the sensor hub 235, the sensor hub 235 may request information on the details of an actual physical operation of the geomagnetic field sensor using the connected communication path. The sensor hub 235 may transfer the information on the details of the actual physical operation of the geomagnetic field sensor to the first processor 210 using various communication paths such as an inter-integrated circuit (I2C) or a serial peripheral interface (SPI).

FIG. 3 is a table illustrating example time delay and example consumption current in the comparative embodiment of FIG. 2.

In a case of an operation of the grip sensor 232, when an electronic device (e.g., the electronic device 200 of FIG. 2) is operated in a deactivated mode, the grip sensor 232 may activate a first processor (e.g., the first processor 210 of FIG. 2) and communicate with the first processor 210 to transfer information of a sensor (e.g., the sensor circuit 230 of FIG. 2). The first processor 210 may identify a physical change in the electronic device 200 through the communication process. In addition, the first processor 210 may transfer information on the physical change in the electronic device 200 to a second processor (e.g., the processor 220 of FIG. 2) using a radio interface layer 215. According to Table 310 in FIG. 3, in the process of transferring the information on the physical change, a time delay of a few tens of msec (e.g., 40 msec) may occur, and an approx. 30-50 mA current may be consumed.

The sensor hub 235 may minimize and/or reduce the consumption current of the system in a deactivated state of the electronic device 200. However, when a geomagnetic field sensor is used in a state in which the electronic device 200 is activated, information of the sensor circuit 230 is transferred using the sensor hub 235, and thus even longer time delays may occur. According to Table 320 of FIG. 3, when the system of the electronic device 200 is activated, a time delay of approx. 30-100 msec may occur. In order to prevent and/or reduce the time delay, the sensor hub 235 may be omitted from the components of the electronic device.

However, when the system of the electronic device 200 is deactivated, the consumption current may be reduced to approx. 0.1 mA or less using the sensor hub 235. Considering the consumption current reduction effect, it may be more efficient to configure whether to use the sensor hub 235 according to the activation state of the electronic device 200 rather than to omit the sensor hub 235 from the electronic device 200. Hereinafter, an electronic device for variably controlling whether to communicate with an application processor, a communication processor, and/or a sensor hub in response to whether the system of the electronic device 200 is activated, and a communication method thereof will be described in greater detail.

Figure 4:
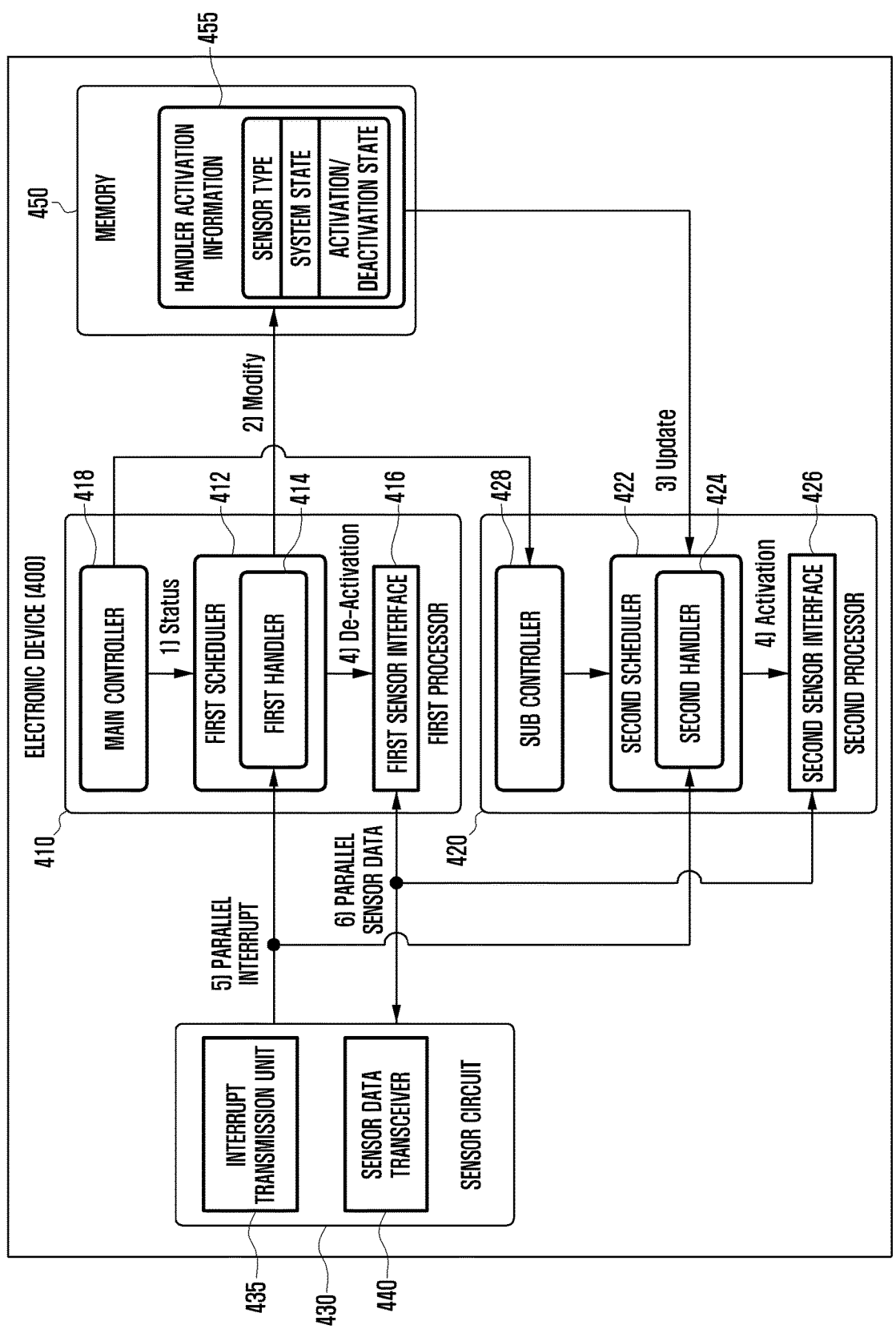
FIG. 4 is a block diagram illustrating an example configuration of an electronic device according to various embodiments.

FIG. 4 is a block diagram illustrating an example configuration of an electronic device according to various embodiments.

According to various embodiments, an electronic device 400 may include a first processor (e.g., including processing circuitry) 410, a second processor (e.g., including processing circuitry) 420, a sensor circuit 430, and a memory 450. The first processor 410 may include, for example, an application processor, and the second processor 420 may include, for example, a communication processor or a sensor hub. The first processor 410 and the second processor 420 may be configured to carry out computation or data processing relating to control and/or communication of components of the electronic device 400, and may include at least a part of a configuration and/or a function of the processor 120 of FIG. 1. The first processor 410 and the second processor 420 may be electrically connected to each component (e.g., the sensor circuit 430 or a sensor hub (e.g., the sensor hub 235 of FIG. 2)) of the electronic device 400.

According to various embodiments, the sensor circuit 430 may be configured to detect an operational state (e.g., power or temperature) of the electronic device 400 or an environmental state (e.g., a state of a user) external to the electronic device 400, and generate an electrical signal or data value corresponding to the detected state, and may include at least a part of a configuration and/or a function of the sensor module 176 of FIG. 1. The sensor circuit 430 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, etc.

According to various embodiments, the memory 450 may temporarily or permanently store various digital data pieces and may include at least one configuration and/or function of the memory 130 of FIG. 1. The memory 450 may include a non-volatile memory such as a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a sloid state drive (SSD), and a volatile memory such as a dynamic RAM (DRAM), a static RAM, or a synchronous dynamic RAM (SDRAM). The memory 450 may store various instructions which can be performed by the first processor 410 and the second processor 420. The instructions may include various control commands including arithmetic and logic operations, data transfer, or input/output, which are recognizable by the first processor 410 and the second processor 420.

According to various embodiments, the memory 450 may include handler activation information 455. The memory 450 may be electrically connected to the first processor 410 and the second processor 420 to share the handler activation information 455. The handler activation information 455 may be stored in the memory 450, and may be amended by the first processor 410. The handler activation information 455 may record a handler activation state of each processor (e.g., the first processor 410 or the second processor 420). The first processor 410 and the second processor 420 may determine whether to receive an interrupt signal in response to the handler activation information. The initial handler activation information 455 may be stored in the memory 450, and may be pre-configured in a designing operation of the electronic device 400. Hereafter, the first processor 410 (e.g., a main processor) may amend (e.g., modify) the handler activation information 455 in response to a system state of the electronic device 400, and the second processor 420 may determine whether an interrupt handler is activated, in response to the amended (e.g., modified) handler activation information 455. The process thereof will be described in greater detail below with reference to FIGS. 5 and 6.

According to various embodiments, the sensor circuit 430 may transmit an interrupt signal using an interrupt transmission unit (e.g., including various circuitry) 435 electrically connected to the first processor 410 and the second processor 420, and may transmit sensor data using a sensor data transceiver 440 electrically connected to the first processor 410 and the second processor 420. According to an embodiment, the sensor circuit 430 may variably adjust the strength of the interrupt signal according to the number of processors (e.g., the first processor 410 or the second processor 420) connected to the sensor circuit 430. For example, when the number of processors required to operate the electronic device 400 is one, the number of lines required to transmit the interrupt signal and sensor data is also one, but when the number of processors required to operate the electronic device 400 increases to N (e.g., three) exceeding one, the number of lines may also increase to N. In addition to the increase in the number of lines, when the length or the width of the line increases, a value of the strength of the current may be determined in proportion thereto. The changed value of the strength of the current may be actually applied at the moment of initial booting of the system of the electronic device 400. A power unit (not shown) in the sensor circuit 430 may supply a current that is proper for the determined value of the strength of the current to the electronic device 400.

In this case, the amount of the current flowing through the line for transmission of the interrupt signal and sensor data may be insufficient. The main processor of the electronic device 400 may change the strength of the current in each line for transmission of the interrupt signal and sensor data. Through the above-described process, the electronic device 400 may smoothly maintain the interrupt operation.

According to various embodiments, the first processor 410 may detect a system state of the electronic device 400, amend handler activation information in the memory in response to the system state of the electronic device 400, and determine whether to receive an interrupt signal transmitted from the sensor circuit 430. The second processor 420 may determine whether to receive the interrupt signal transmitted from the sensor circuit 430, in response to the amended handler activation information. An interrupt handler (not shown) may refer, for example, to software which performs a special pre-configured operation in response to the interrupt signal.

For example, in a case in which the sensor circuit 430 corresponds to a grip sensor (e.g., the grip sensor 232 of FIG. 2), the grip sensor 232 may transmit an electrical interrupt signal to the first processor 410 when a hand grip event occurs. The first processor 410 (e.g., an application processor) may receive whether a hand grip is made and/or grip sensitivity information from the sensor circuit 430, in response to the interrupt signal. In addition, in a case in which the sensor circuit 430 includes a geomagnetic sensor, when a magnetic field therearound exceeds a particular value, the geomagnetic sensor may detect the excess of the particular value and transmit sensor data including the electrical interrupt signal and/or magnetic field value to the second processor 420 (e.g., the sensor hub 235).

According to an embodiment, the first processor 410 may amend the handler activation information 455 in the memory 450 by monitoring the system state of the first processor 410, and activate a first scheduler 412 in the first processor 410 in response to the handler activation information 455. The handler activation information 455 may include the type of the sensor circuit 430, the system state (e.g., activation (awake), deactivation (sleep), and overload (busy)), or information related to whether the interrupt handler (not shown) is activated.

The first processor 410 may receive an interrupt signal from the sensor circuit 430 connected in parallel to the first processor 410 and the second processor 420 using the activated first scheduler 412, and may receive sensor data from the sensor circuit 430 in response to the interrupt signal. In response to the type of the sensor circuit 430 and the system state, the first processor 410 may record whether the interrupt handler (not shown) is activated and transfer the corresponding information to the processor 420.

The second processor 420 may recognize the handler activation information in the memory 450, the information being amended by the first processor 410, and activate a second scheduler 422 in the second processor 420 in response to the handler activation information 455. The second processor 420 may receive an interrupt signal from the sensor circuit 430 connected in parallel to the first processor 410 and the second processor 420 using the activated second scheduler 422, and may receive sensor data from the sensor circuit 430 in response to the interrupt signal.

According to an embodiment, the memory 450 may include a physical memory area in which software of the first processor 410 and software of the second processor 420 can simultaneously access the same memory address. When a particular variable or a particular function is defined in the corresponding memory area, both the first processor 410 and the second processor 420 may commonly use the corresponding area.

The electronic device 400 according to various embodiments may include a first processor 410, a second processor 420, the sensor circuit 430, and a memory 450. The first processor 410 may include a first scheduler 412, a first handler 414, a first sensor interface 416, and a main controller 418. The second processor 420 may include a second scheduler 422, a second handler 424, a second sensor interface 426, and a sub controller 428.

According to an embodiment, the main controller 418 in the first processor 410 may detect an overall system state of the electronic device 400 and perform an operation configured to be linked to other sub systems. The sub controller 428 in the second processor 420 may transmit or receive data to or from the main controller 418 and control a communication performance module when the second processor 420 includes a communication processor. The sub controller 428 may transmit or receive data to or from the main controller 418 and solely collect and transmit information of the sensor circuit 430 when the second processor 420 includes a sensor hub (e.g., the sensor hub 235 of FIG. 2).

According to an embodiment, a scheduler including the first scheduler 412 and a second scheduler 422 may receive one or more individual interrupt signals transmitted from multiple sensors connected to one processor (e.g., an AP, a CP, or a sensor hub). The scheduler may change execution orders or priorities of a handler in consideration of limited resources of a processor, in response to the one or more interrupt signals. In addition, the scheduler including the first scheduler 412 and the second scheduler 422 may be simultaneously connected to one or more processors (e.g., an AP, a CP, and a sensor hub) having different systems. The scheduler may update the interrupt handler information 455 according to the state (e.g., sleep, busy, or awake) of the multiple processors, and may utilize a system resource in response to the state of the multiple processors by sharing the interrupt handler information 455 in real time and/or periodically.

According to an embodiment, an interrupt handler including the first handler 414 and the second handler 424 may include software which recognizes the transmitted electrical interrupt signal and performs a predetermined operation that is pre-configured when an electrical interrupt signal is transmitted from the sensor circuit 430. Each of the first scheduler 412 and the second scheduler 422 may receive, using the handler activation information 455 in the memory 450, an interrupt signal only when an interrupt handler that is controlled by the first scheduler 412 and the second scheduler 422 itself is activated. The interrupt handler may refer, for example, to a part of a program stored in a processor (e.g., the first processor 410) rather than hardware existing in the system. A single sensor circuit 430 may transfer an interrupt signal to a multiprocessor including the first processor 410 and the second processor 420. In this case, a scheduler (e.g., the first scheduler 412 or the second scheduler 422) may prevent and/or reduce a collision of an interrupt processing process and a process result by controlling an interrupt handler (e.g., the first handler 414 or the second handler 424).

According to an embodiment, even though having different software bases of the first handler 414 and the second handler 424, the first handler 414 and the second handler 424 may be basically programmed to perform the same operation. The first sensor interface 416 and the second sensor interface 426 may control a flow of sensor data. In this case, the sensor data may include information on an operation of the sensor circuit 430.

According to an embodiment, a transmission protocol of a sensor interface may include, for example, and without limitation, at least one of an inter-integrated circuit (I2C), a serial peripheral interface (SPI), an improved inter-integrated circuit (I3C), a 1-wire scheme, etc.

According to an embodiment, the first processor 410 may further include the first sensor interface 416 for requesting transmission of sensor data from the sensor circuit 430, and when it is identified that the first processor 410 processes an interrupt of the sensor circuit 430, the first processor 410 may control the first sensor interface 416 to be activated so as to make the first sensor interface 416 request the sensor data, in response to the received interrupt signal. In addition, the second processor 420 may further include the second sensor interface 426 for requesting transmission of sensor data from the sensor circuit 430, and when it is identified that the second processor 420 processes an interrupt of the sensor circuit 430, the second processor 420 may control the second sensor interface 426 to be activated so as to make the second sensor interface 426 request the sensor data, in response to the received interrupt signal.

Figure 5:
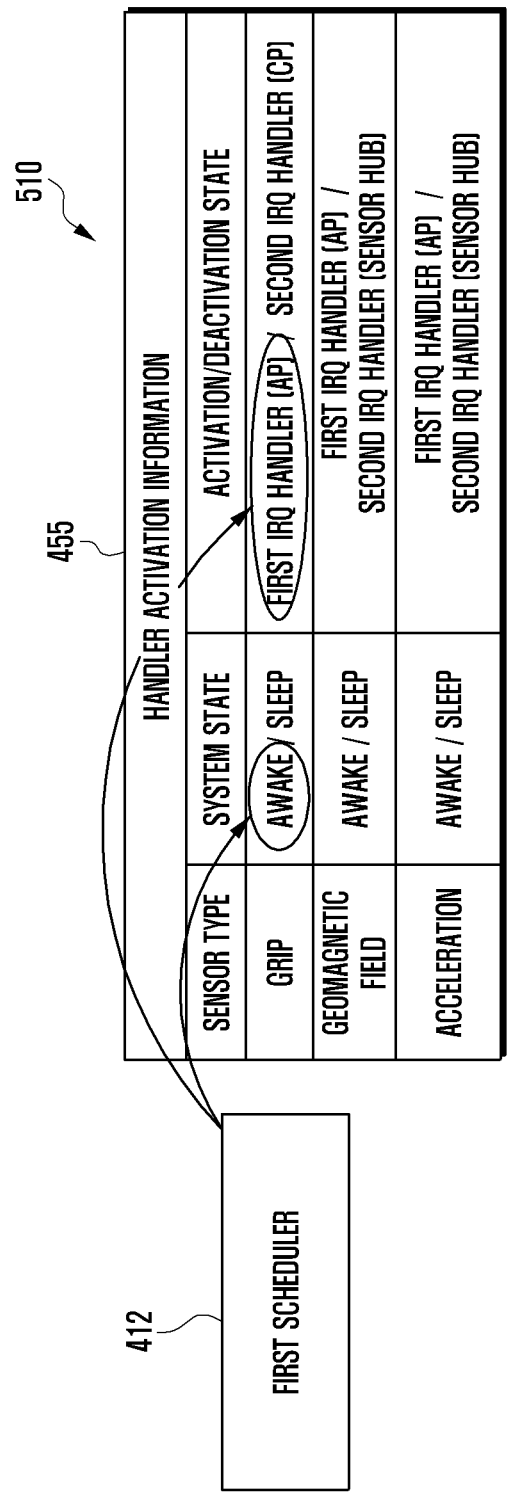
FIGS. 5 and 6 are diagrams illustrating an example process of amending and recognizing handler activation information of an electronic device according to various embodiments.
Figure 6:
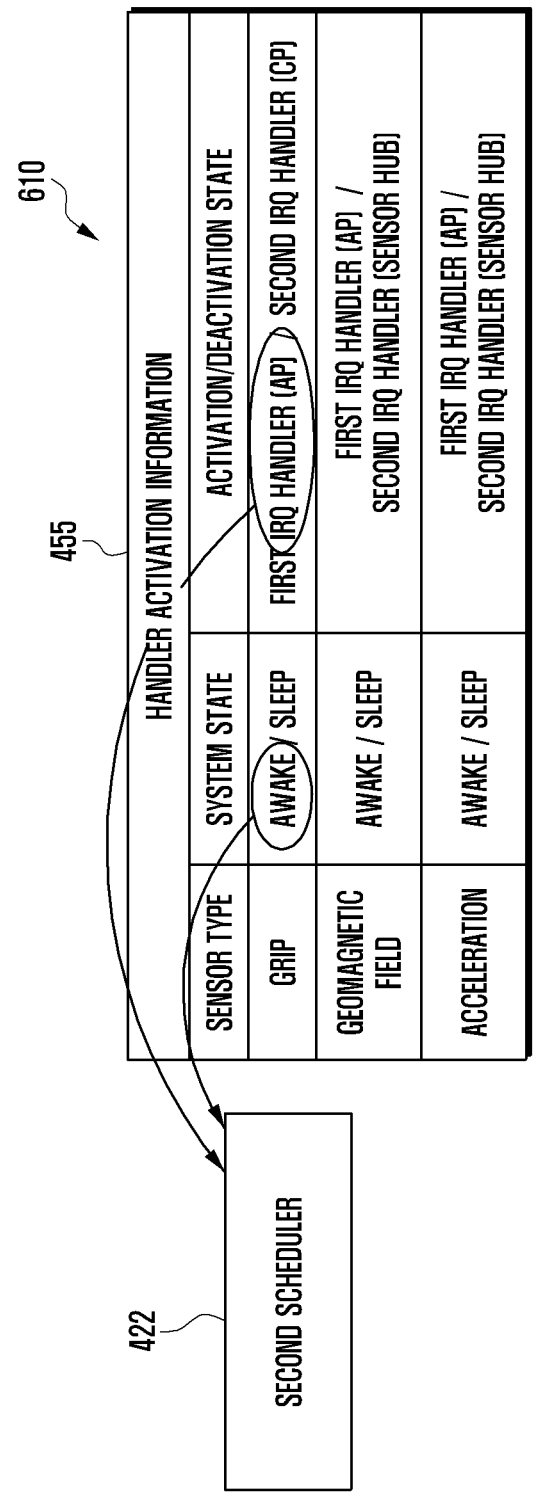

FIGS. 5 and 6 diagrams illustrating example processes of amending and recognizing handler activation information of an electronic device according to various embodiments.

According to various embodiments, a first processor (e.g., the first processor 410 of FIG. 4) may detect a system state of an electronic device (e.g., the electronic device 400 of FIG. 4) and amend handler activation information 455 in a memory (e.g., the memory 450 of FIG. 4) in response to the system state of the electronic device 400. The handler activation information 455, which is described above with reference to FIG. 4, may include information related to the type of a sensor, the state of a system, and whether a handler is activated. According to Table 510, a first scheduler (e.g., the first scheduler 412 of FIG. 4) in the first processor 410 may amend the system state in the handler activation information 455 in response to the system state of the electronic device 400. In addition, the memory 450 may store instructions causing the first processor 410 to process an interrupt of the sensor circuit 430 in response to the system state and the handler activation information 455.

According to various embodiments, the second processor 420 may recognize the amended handler activation information 455. According to Table 610, a second scheduler (e.g., the second scheduler 422 of FIG. 5) in the second processor 420 may determine whether to process an interrupt of the sensor circuit 430 by the second processor 420, in response to the amended handler activation information 455.

In addition, the second processor 420 may detect a system state of the electronic device 400 and amend handler activation information 455 in the memory 450 in response to the system state of the electronic device 400. In addition, the second processor 420 may determine whether to process an interrupt of the sensor circuit 430, in response to the system state. The first processor 410 may recognize the handler activation information 455 amended by the second processor 420. In this case, arrows may be oriented in directions opposite to those of the arrows indicated in FIG. 6. That is, the second processor 420 may amend handler activation information 455, and the first processor 410 may determine whether to process an interrupt of the sensor circuit 430, in response to the amended activation information 455. However, it may be difficult for the second processor 420 (e.g., a sub controller) to identify the entire system state of the electronic device 400. In this case, the second processor 420 (e.g., the sub controller) may partially identify the system state for a partial area of the electronic device 400 using the first processor 410 (e.g., a main controller), the partial area being dynamically allowed by the first processor 410 (e.g., the main controller).

Figure 7:
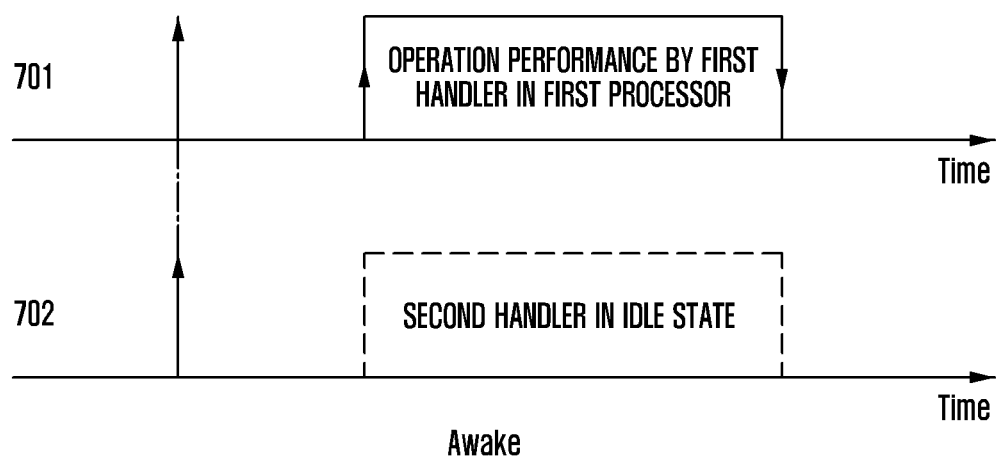
FIGS. 7 and 8 are graphs illustrating example handler activation state in time units according to a system state of an electronic device according to various embodiments.
Figure 8:
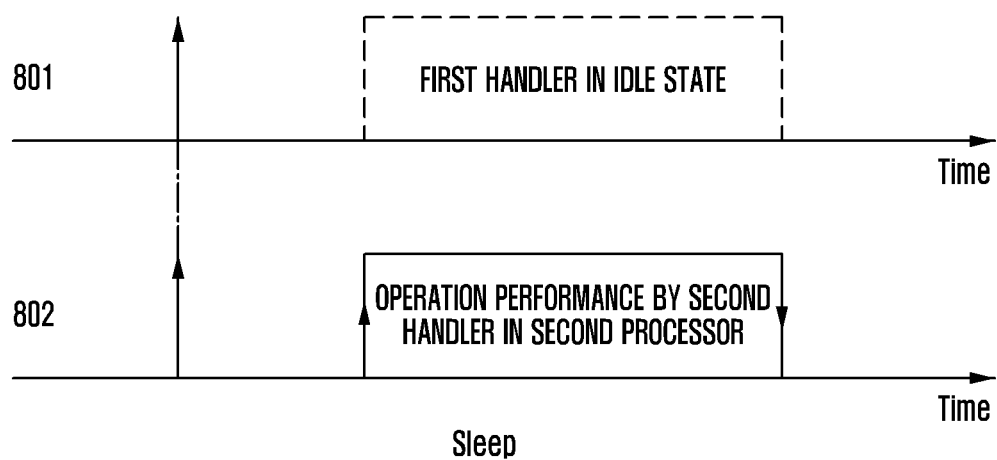

FIGS. 7 and 8 are graphs illustrating example handler activation states in time units according to a system state of an electronic device according to various embodiments.

According to an embodiment, a first processor (e.g., the first processor 410 of FIG. 4) may receive an interrupt signal transmitted from a sensor circuit (e.g., the sensor circuit 430 of FIG. 4) when a first handler (e.g., the first handler 414 of FIG. 4) in the first processor 410 is activated, and may receive sensor data from the sensor circuit 430 in response to the interrupt signal. A second processor (e.g., the second processor 420 of FIG. 4) may receive an interrupt signal transmitted from the sensor circuit 430 when a second handler (e.g., the second handler 424 of FIG. 5) in the second processor 420 is activated, and may receive sensor data from the sensor circuit 430 in response to the interrupt signal. As described above, the first handler 414 and the second handler 424 may refer, for example, to a part of a program stored in a processor rather than hardware such as a processor (e.g., the first processor 410), the sensor circuit 430, or the memory 450.

According to an embodiment, the first processor 410 may control the first handler 414 in the first processor 410 to be activated when the system state of the electronic device 400 corresponds to an activated (awake) state, and the second processor 420 may control the second handler 424 in the second processor 420 to be activated when the system state of the electronic device 400 corresponds to a deactivated (sleep) state.

According to FIG. 7, when the system state of the electronic device 400 corresponds to the activated (awake) state, it may be identified that the first handler 414 in the first processor 410 is in a state performing an operation as shown in graph 701 and the second handler 424 in the second processor 420 is in an idle state as shown in graph 702. In this case, the sensor circuit 430 may simultaneously transmit an interrupt signal to the first processor 410 and the second processor 420. However, a system may be controlled so that a first scheduler (e.g., the first scheduler 412 of FIG. 4) and a second scheduler (e.g., second scheduler 422 of FIG. 4) respond to the received interrupt signal only when handlers in the first scheduler and the second scheduler are activated even though the interrupt signal is simultaneously transmitted using an interrupt transmission unit 435 connected in parallel. According to the scheme described above, occurrence of an error which may be caused by a simultaneous operation of at least one multiprocessor can be prevented and/or mitigated, and a delay time and a consumption current can be reduced by operating a necessary processor only.

According to FIG. 8, when the system state of the electronic device 400 corresponds to the deactivated (sleep) state, the second handler 424 in the second processor 420 may perform an operation, and the state of the first handler 414 in the first processor 410 may correspond to an idle state. In this case, the sensor circuit 430 may simultaneously transmit an interrupt signal to the first processor 410 and the second processor 420, and the remaining operations of the first processor 410 and the second processor 420 are the same as the description made in FIG. 7.

According to FIG. 8, when the system state of the electronic device 400 corresponds to a deactivated (sleep) state, it may be identified that the first handler 414 in the first processor 410 is in an idle state as shown in graph 801 and the second handler 424 in the second processor 420 is in a state performing an operation as shown in graph 802. In this case, the sensor circuit 430 may simultaneously transmit an interrupt signal to the first processor 410 and the second processor 420. However, a system may be controlled so that a first scheduler (e.g., the first scheduler 412 of FIG. 4) and a second scheduler (e.g., second scheduler 422 of FIG. 4) respond to the received interrupt signal only when handlers in the first scheduler and the second scheduler are activated even though the interrupt signal is simultaneously transmitted using an interrupt transmission unit 435 connected in parallel.

Figure 9:
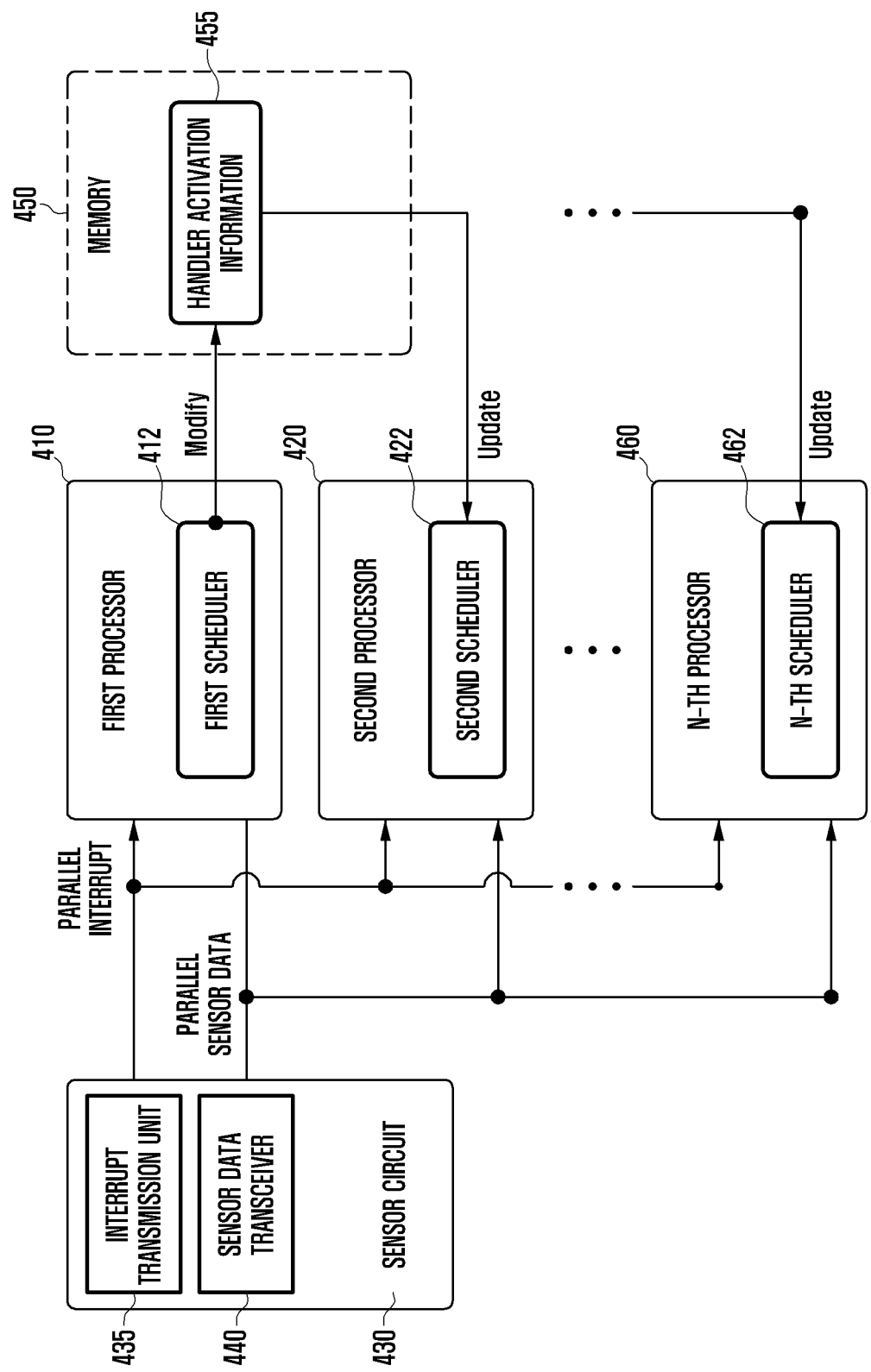
FIG. 9 is a block diagram illustrating an example configuration in which the number of processors in an electronic device is expanded according to various embodiments.

FIG. 9 is a block diagram illustrating an example configuration in which a processor in an electronic device is expanded according to various embodiments.

According to various embodiments, an electronic device (e.g., the electronic device 400 of FIG. 4) may include the same or similar components of the electronic device described above with reference to FIGS. 4 and 5, and may further include an N-th processor 460 and an N-th scheduler 462 in the N-th processor 460. Hereinafter, a case in which N=3 and the electronic device 400 further includes a third processor 460 and a third scheduler 462 is described, but the number of the processors and the number of the schedulers may not be limited to three.

According to an embodiment, the first processor 410 may detect a system state of the electronic device 400, amend handler activation information 455 in the memory 450 in response to the system state of the electronic device 400, and determine whether to receive interrupt signal transmitted from the sensor circuit 430. The second processor 420 and the third processor 460 may determine whether to receive an interrupt signal transmitted from the sensor circuit 430, in response to the amended handler activation information 455.

According to an embodiment, the third processor 460 may receive an interrupt signal transmitted from the sensor circuit 430 when a third handler 462 in the third processor 460 is activated, and may receive sensor data from the sensor circuit 430 in response to the interrupt signal.

Like the electronic device 400 described with reference to FIGS. 4 and 5 above, the first processor 410 may detect a system state through a main controller (e.g., the main controller 418 of FIG. 5) and amend handler activation information 455 in the memory 450. The second processor 420 and the third processor 460 may recognize the amended handler activation information 455 and determine whether handlers in the second processor 420 and the third processor 460 are activated, in response to the amended handler activation information 455. In addition, an interrupt signal may be simultaneously transferred through an interrupt transmission unit 435 which connects the sensor circuit 430 to the first processor 410, the second processor 420, and the third processor 460 in parallel. The processor may receive the interrupt signal only when the handler in the processor is activated even though the interrupt signal is simultaneously transferred, as described with reference to FIGS. 7 and 8 above. According to the described operation, even when the sensor circuit 430 is connected to more than one processor in parallel, the electronic device 400 may individually operate each processor.

FIG. 10 is a table illustrating an effect of application of an electronic device according to various embodiments.

According to Table 1010, in a case of in which an internal scheduler is not used, for example, in a case of a grip sensor, sensor data may be transmitted to a second processor (e.g., a CP) using a first processor (e.g., an AP). In this case, the sensor data may be transmitted through both the first processor (e.g., the first processor 410 of FIG. 4) and the second processor (e.g., the second processor 420 of FIG. 4), and the first processor 410 in the deactivated state may need to be activated. While the first processor 410 in the deactivated state is activated, an approx. 40 msec or longer time delay and a 30-50 mA consumption current may occur.

According to the disclosure, when sensor data is processed using an electronic device (e.g., the electronic device 400 of FIG. 4), a first scheduler (e.g., the first scheduler 412 of FIG. 4) and a second scheduler (e.g., the second scheduler 422 of FIG. 4) may control a first handler (e.g., the first handler 414 of FIG. 5) in the first processor 410 to be deactivated and control only a second handler (e.g., the second handler 424 of FIG. 5) in the second processor 420 to be activated. In this case, the first processor 410 may be maintained in the deactivated state, and sensor data from the sensor circuit 430 may be received while only the second processor 420 is activated. In this case, as compared to the case in which the first processor 410 is activated, there is no consumption of a current, and a delay time is also reduced to 10 msec.

Table 1020 is a table illustrating an effect in a case in which an internal scheduler is not used, for example, in a case in which the disclosure is applied to a six-axis sensor. Detailed principles are the same as or similar those in the description made in FIGS. 4, 5, 6, 7 and 8 above, but Table 1020 shows a case in which a six-axis sensor transmits sensor data to the first processor 410 (e.g., an AP) as a destination unlike the case of Table 1010 above. When transmitting the sensor data to the first processor 410, the six-axis sensor may use the second processor 420 (e.g., a sensor hub). The second processor 420 may be used for the purpose of minimizing and/or reducing the consumption current in a case in which the electronic device 400 is in a deactivated state, but when the system state of the electronic device 400 corresponds to an activated state, a time delay may occur while the sensor data passes through the second processor 420. In this case, the sensor circuit 430 may reduce a delay time by transmitting sensor data to the first processor 420 while not activating the second processor 420. When the electronic device 400 is deactivated, the sensor circuit 430 may reduce the consumption current by activating the second processor 420 and transmitting sensor data to the first processor 410 using the second processor 420.

In order to achieve the effects of time delay reduction and consumption current reduction, there may be a need for adjusting whether to receive an interrupt of the first processor 410 and the second processor 420 in response to whether the system of the electronic device 400 is activated, and the effects of time delay reduction and consumption current reduction can be achieved through the electronic device 400 according to the disclosure. For example, according to Table 1020, when the system of the electronic device 400 is in an activated state, the sensor circuit 430 may directly transmit sensor data to the first processor 410 and reduce a time delay to 10 msec. When the system of the electronic device 400 is in a deactivated state, the sensor circuit 430 may transmit sensor data to the first processor 410 through the second processor 420 and reduce a consumption current to 0.1 mA or less.

According to an embodiment, the memory 450 may store instructions which cause the first processor 410 not to respond to an interrupt signal when it is identified using interrupt handler activation information that the first processor 410 does not process an interrupt of the sensor circuit 430.

According to an embodiment, the memory 450 may store instructions which cause the second processor 420 not to respond to an interrupt signal when it is identified using interrupt handler activation information that the second processor 420 does not process an interrupt of the sensor circuit.

According to an embodiment, the memory 450 may store instructions which cause amendment to interrupt handler activation information to make the second processor 420 not process an interrupt of the sensor circuit 430 when it is identified that the first processor 410 does not process an interrupt of the sensor circuit 430, and cause amendment to the interrupt handler activation information to make the first processor 410 not process the interrupt of the sensor circuit 430 when it is identified that the second processor 420 does not process the interrupt of the sensor circuit 430.

According to an embodiment, the memory 450 may store instructions which control the first processor 410 to process the interrupt of the sensor circuit 430 when the system of the electronic device 400 is in an activated (awake) state, and control the second processor 420 to process the interrupt of the sensor circuit 430 when the system of the electronic device 400 is in a deactivated (sleep) state.

According to an embodiment, the first processor 410 may further include a first sensor interface requesting transmission of sensor data from the sensor circuit 430, the second processor 420 may further include a second sensor interface 426 requesting transmission of sensor data from the sensor circuit 430, and the memory 450 may store instructions which cause activation of an first sensor interface 416 to make the first sensor interface 416 request the sensor data when it is identified that the first processor 410 processes the interrupt of the sensor circuit 430, and cause activation of a second sensor interface 426 to make the second sensor interface 426 request the sensor data when it is identified that the second processor 420 processes the interrupt of the sensor circuit 430.

According to an embodiment, a data transmission protocol of each of the first sensor interface 416 and the second sensor interface 426 may include at least one of an inter-integrated circuit (I2C), a serial peripheral interface (SPI), an improved inter-integrated circuit (I3C), and a 1-wire scheme.

According to an embodiment, the sensor circuit 430 may variably control an interrupt signal according to the number of processors connected to the sensor circuit 430.

According to an embodiment, the first processor 410 may include an application processor, and the second processor 420 may include a communication processor or a sensor hub.

Figure 11:
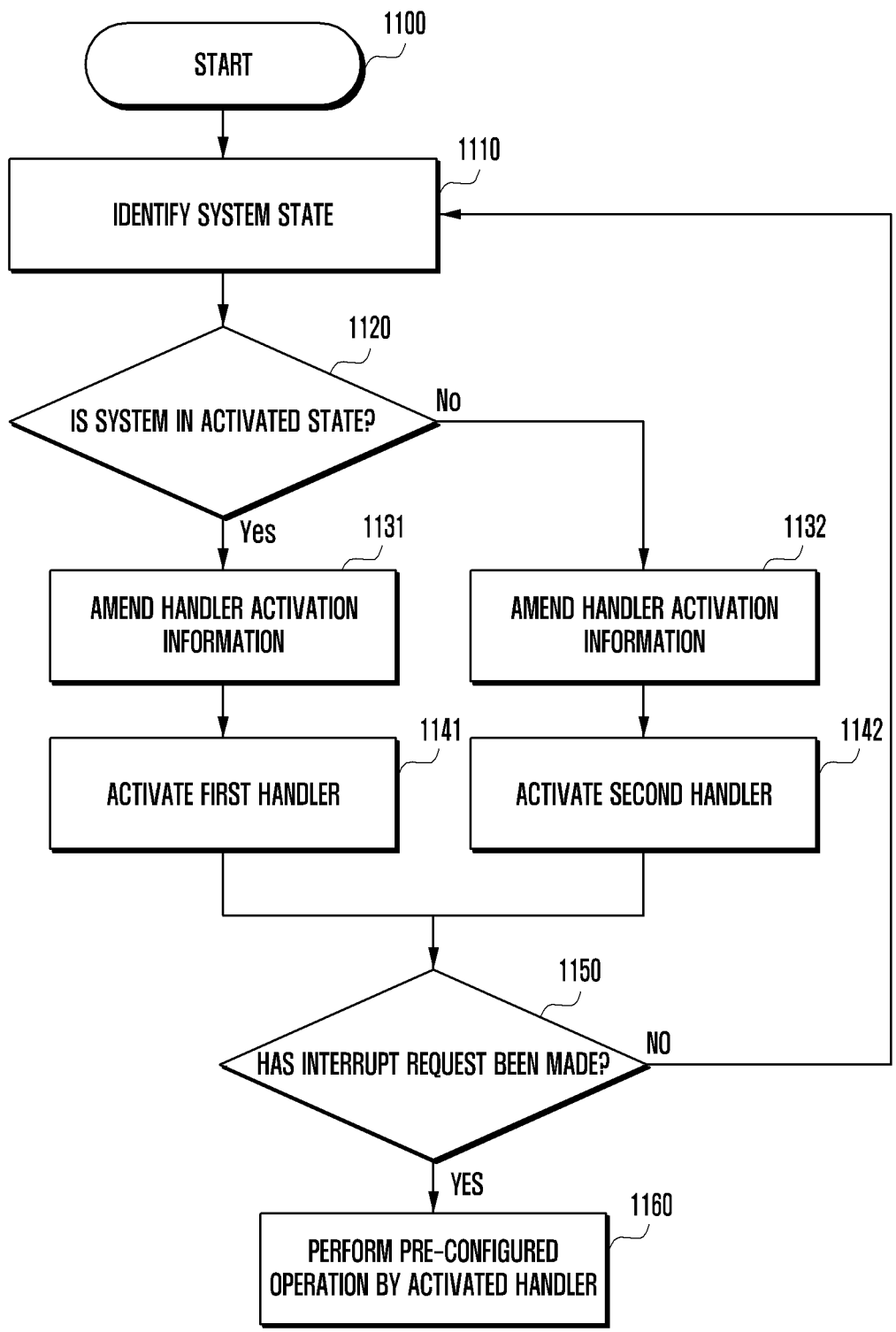
FIG. 11 is a flowchart illustrating an example method for processing sensor data by an electronic device according to various embodiments.

FIG. 11 is a flowchart illustrating an example method for processing sensor data by an electronic device according to various embodiments.

The method 1100 described herein may be performed by an electronic device (e.g., the electronic device 400 of FIG. 4) described with reference to FIGS. 1, 2, 3, 4, 5, 6, 7, 8, 9 and 10 above, and the above-described technical features may not be repeated here.

According to various embodiments, a method for processing sensor data by the electronic device 400 may include identifying a current system state of the electronic device 400 by a first processor (e.g., the first processor 410 of FIG. 4), amending handler activation information (e.g., the handler activation information 455 of FIG. 4) in a memory (e.g., the memory 450 of FIG. 4) in response to the current system state of the electronic device 400, recognizing the amended handler activation information 455 by a second processor (e.g., the second processor 420 of FIG. 4), and in response to the handler activation information 455, determining whether to receive an interrupt signal transmitted from a sensor circuit (e.g., the sensor circuit 430 of FIG. 4) by the first processor 410 and the second processor 420.

In operation 1110, a main controller (e.g., the main controller 418 of FIG. 5) in the first processor 410 may identify a system state of the electronic device 400. The system state of the electronic device 400 may include an activated (awake) state and a deactivated (sleep) state.

In operation 1120, a first scheduler (e.g., the first scheduler 412 of FIG. 4) in the first processor 410 may amend the handler activation information 455 in the memory 450 in response to the system activation state. When the system state corresponds to the activated state, the handler activation information 455 may be amended to activate a first handler (e.g., the first handler 414 of FIG. 5) in the first processor 410 in operation 1131, and when the system state corresponds to the deactivated state, the handler activation information 455 may be amended to activate a second handler (e.g., the second handler 424 of FIG. 5) in operation 1132. In operation 1141, the first scheduler 412 may activate the first handler 414 in response to the amended activation information. In operation 1142, the second scheduler 422 in the second processor 420 may recognize the amended activation information and control the second handler 424 to be activated when the system state of the electronic device 400 corresponds to the deactivated state. The first scheduler 412 may receive an interrupt signal only when the first handler 414 is activated, and the second scheduler 422 may receive an interrupt signal only when the second handler 424 is activated.

In operation 1150, the sensor circuit 430 may generate a signal including an interrupt request. The interrupt signal may be simultaneously transmitted to the first processor 410 and the second processor 420 through an interrupt transmission unit (e.g., the interrupt transmission unit 435 of FIG. 4) connected to the first processor 410 and the second processor 420 in parallel. According to an embodiment, the sensor circuit 430 may variably adjust a drive strength of the interrupt signal according to the number of processors connected to the sensor circuit 430.

In operation 1160, the first scheduler 412 and the second scheduler 422 may receive, using the handler activation information 455 in the memory 450, the interrupt signal only when the first handler 414 or the second handler 424 which is controlled by the first scheduler 412 or the second scheduler 422 itself is activated.

According to an embodiment, the first processor 410 may receive the interrupt signal transmitted from the sensor circuit 430 when the first handler 414 in the first processor 410 is activated, and receive sensor data from the sensor circuit 430 in response to the interrupt signal. The second processor 420 may receive the interrupt signal transmitted from the sensor circuit 430 when the second handler 424 in the second processor 420 is activated, and receive sensor data from the sensor circuit 430 in response to the interrupt signal.

Figure 12:
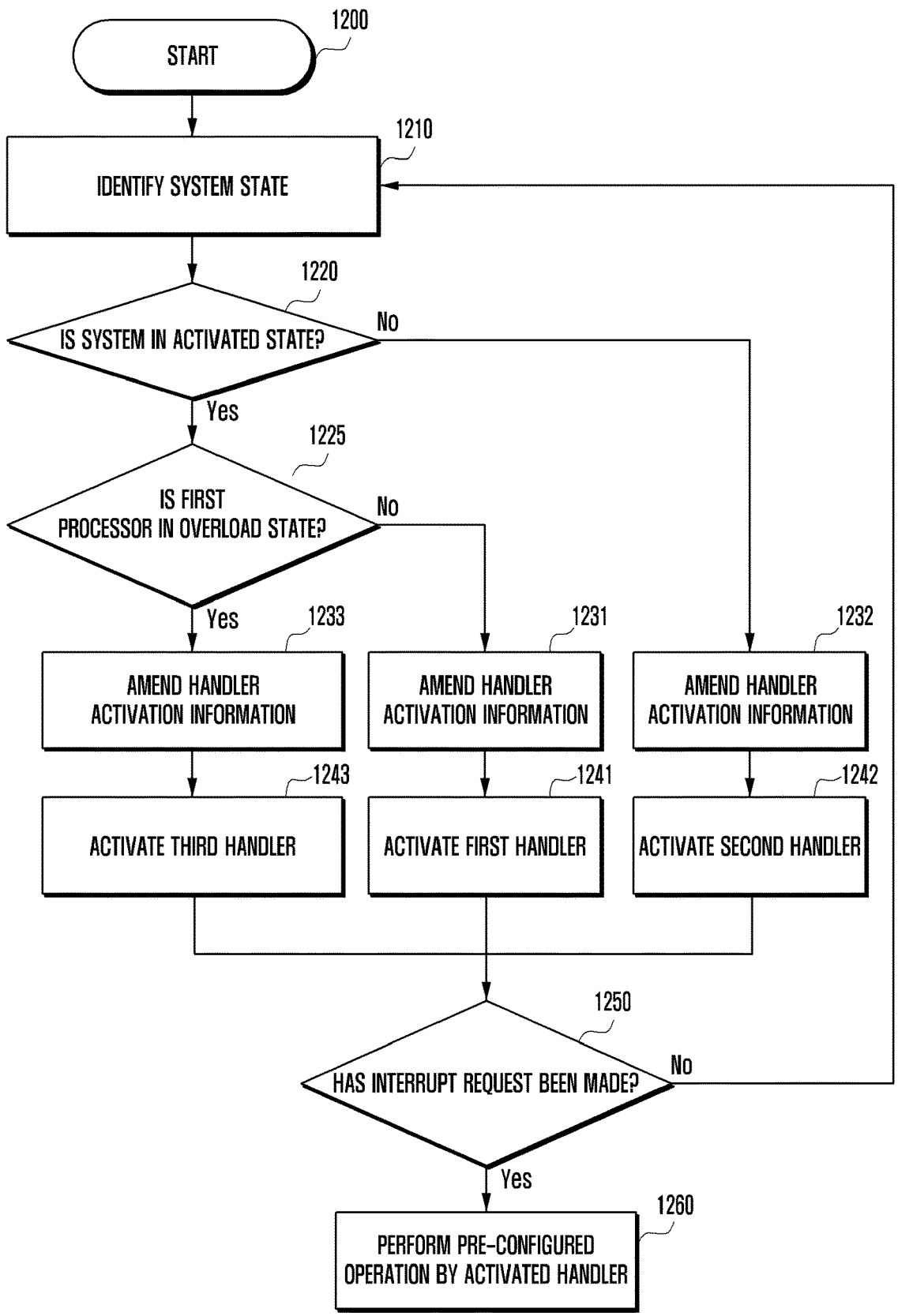
FIG. 12 is a flowchart illustrating an example method for processing sensor data by an electronic device according to various embodiments.

FIG. 12 is a flowchart illustrating an example method for processing sensor data by an electronic device according to various embodiments.

The method 1200 described above may be performed by an electronic device (e.g., the electronic device 400 of FIG. 4) described with reference to FIGS. 1, 2, 3, 4, 5, 6, 7, 8, 9 and 10 above, and the above-described technical features may not be repeated here.

In operation 1210, the main controller 418 in the first processor 410 may identify a system state of the electronic device 400. The system state of the electronic device 400 may include an activated (awake) state, a deactivated (sleep) state, and an overload (busy) state. The overload (busy) state may refer, for example, to a state in which the usage of a system resource exceeds a predetermined level (e.g., 70%) due to a large amount of throughput of the first processor 410 (e.g., the AP), thereby causing a lack of system resources for processing an interrupt request.

In operation 1220, the first scheduler 412 in the first processor 410 may amend the handler activation information 455 in the memory 450 in response to the system activation state. When the system state corresponds to the activated state, the handler activation information 455 may be amended to activate the first handler 414 in the first processor 410 in operation 1231, and when the system state corresponds to the deactivated state, the handler activation information 455 may be amended to activate the second handler 424 in the second processor 420 in operation 1232. In operation 1241, the first scheduler 412 may activate the first handler 414 in response to the amended handler activation information 455. In operation 1242, the second scheduler 422 in the second processor 420 may recognize the amended handler activation information 455 and control the second handler 424 to be activated when the system state of the electronic device 400 corresponds to the deactivated state. In operation 1243, the third scheduler (e.g., the N-th scheduler 462 of FIG. 9) in the third processor (e.g., the N-th processor 460 of FIG. 9) may recognize the amended handler activation information 455 and control the third handler 462 to be activated when the system state of the electronic device 400 corresponds to the overload state. The overload (busy) state may refer, for example, to a state in which the throughput of the first processor 410 exceeds a predetermined level, thereby causing the first processor 410 to find difficulty in processing other operations.

In operation 1250, the sensor circuit 430 may generate a signal including an interrupt request. The interrupt signal may be simultaneously transmitted to the first processor 410, the second processor 420, and the third processor 460 through the interrupt transmission unit 435 connected to the first processor 410, the second processor 420, and the third processor 460 in parallel. According to an embodiment, the sensor circuit 430 may variably adjust a drive strength of the interrupt signal according to the number of processors connected to the sensor circuit 430.

In operation 1260, the first scheduler 412, the second scheduler 422, and the third scheduler 462 may receive, using the handler activation information 455 in the memory 450, the interrupt signal only when the first handler 414, the second handler 424, or the third handler (not shown) which is controlled by the first scheduler 412, the second scheduler 422, or the third scheduler 462 itself is activated.

According to an embodiment, the first processor 410 may receive the interrupt signal transmitted from the sensor circuit 430 when the first handler 414 in the first processor 410 is activated, and receive sensor data from the sensor circuit 430 in response to the interrupt signal. The second processor 420 may receive the interrupt signal transmitted from the sensor circuit 430 when the second handler 424 in the second processor 420 is activated, and receive sensor data from the sensor circuit 430 in response to the interrupt signal. The third processor 460 may receive the interrupt signal transmitted from the sensor circuit 430 when the third handler (not shown) in the third processor 460 is activated, and receive sensor data from the sensor circuit 430 in response to the interrupt signal.

According to an example embodiment, a method for processing sensor data by the electronic device including a sensor circuit including sensor data and a memory including handler activation information, may include: identifying a current system state of the electronic device by a first processor, amending handler activation information in the memory in response to the current system state of the electronic device, recognizing the amended handler activation information by a second processor, and determining, in response to the handler activation information, whether to receive sensor data transmitted from the sensor circuit by the first processor and the second processor.

According to an example embodiment, the determining of whether to receive sensor data transmitted from the sensor circuit by the first processor and the second processor in response to the handler activation information may include: controlling the second processor not to process an interrupt of the sensor circuit based on identifying, using the interrupt handler activation information, that the first processor processes the interrupt of the sensor circuit, or controlling the first processor not to process an interrupt of the sensor circuit based on identifying, using the interrupt handler activation information, that the second processor processes the interrupt of the sensor circuit.

According to an example embodiment, the amending of the handler activation information in the memory in response to the current system state of the electronic device may include: amending the handler activation information to cause the first processor to process the interrupt of the sensor circuit based on the system state of the electronic device corresponding to an activated (awake) state, or amending the handler activation information to cause the second processor to process the interrupt of the sensor circuit based on the system state of the electronic device corresponding to a deactivated (sleep) state.

What is claimed is:

1. An electronic device comprising:
a sensor circuit;
a memory storing handler activation information; and
a first processor and a second processor operatively connected to the sensor circuit and the memory,
wherein the sensor circuit is configured to transmit an interrupt signal using an interrupt transmission unit comprising circuitry electrically connected to the first processor and the second processor, and configured to transmit sensor data using a sensor data transceiver electrically connected to the first processor and the second processor,
wherein the memory stores instructions which, when executed, cause the first processor to: amend or update interrupt handler activation information in the memory in response to a system state of the electronic device, receive the sensor data from the sensor circuit in response to an interrupt signal transmitted from the sensor circuit based on identifying, using the interrupt handler activation information, that the first processor processes the interrupt of the sensor circuit,
the memory further storing instructions, which, when executed, cause the second processor to: receive the sensor data from the sensor circuit in response to the interrupt signal transmitted from the sensor circuit based on identifying, using the interrupt handler activation information, that the second processor processes the interrupt of the sensor circuit.

2. The electronic device of claim 1, wherein the memory stores instructions which, when executed, cause the first processor to not respond to the interrupt signal based on identifying, using the interrupt handler activation information, that the first processor does not process the interrupt of the sensor circuit.

3. The electronic device of claim 1, wherein the memory stores instructions which, when executed, cause the second processor to not respond to the interrupt signal based on identifying, using the interrupt handler activation information, that the second processor does not process the interrupt of the sensor circuit.

4. The electronic device of claim 1, wherein the memory stores instructions which, when executed, cause amendment to the interrupt handler activation information to cause the second processor to not process the interrupt of the sensor circuit based on identifying that the first processor processes the interrupt of the sensor circuit, and
the instructions, when executed, further causing amendment to the interrupt handler activation information to cause the first processor to not process the interrupt of the sensor circuit based on identifying that the second processor processes the interrupt of the sensor circuit.

5. The electronic device of claim 1, wherein the memory stores instructions which, when executed, control the first processor to process the interrupt of the sensor circuit based on the system state of the electronic device corresponding to an activated state, and control the second processor to process the interrupt of the sensor circuit based on the system state of the electronic device corresponding to a deactivated state.

6. The electronic device of claim 5, wherein the first processor further comprises a first sensor interface configured to request transmission of the sensor data from the sensor circuit,
wherein the second processor further comprises a second sensor interface configured to request transmission of the sensor data from the sensor circuit, and
wherein the memory stores instructions which, when executed, cause activation of the first sensor interface to cause the first sensor interface to request the sensor data based on identifying that the first processor processes the interrupt of the sensor circuit, and
cause activation of the second sensor interface to cause the second sensor interface to request the sensor data based on identifying that the second processor processes the interrupt of the sensor circuit.

7. The electronic device of claim 6, wherein a data transmission protocol of each of the first sensor interface and the second sensor interface comprises at least one of: an inter-integrated circuit (I2C), a serial peripheral interface (SPI), an improved inter-integrated circuit (I3C), and a 1-wire scheme.

8. The electronic device of claim 1, wherein the sensor circuit is configured to variably control a drive strength of the interrupt signal based on a number of processors connected to the sensor circuit.

9. The electronic device of claim 1, wherein the first processor comprises an application processor, and
wherein the second processor comprises at least one of a communication processor or a sensor hub.

10. A method for processing sensor data by an electronic device comprising: a sensor circuit configured to provide sensor data; and a memory comprising handler activation information, the method comprising:
identifying, by a first processor, a current system state of the electronic device;
amending the handler activation information in the memory in response to the current system state of the electronic device;
recognizing the amended handler activation information by a second processor; and
determining whether to process an interrupt signal transmitted from the sensor circuit by the first processor and the second processor in response to the handler activation information.

11. The method of claim 10, further comprising:
receiving, by the first processor, the sensor data from the sensor circuit in response to an interrupt signal based on identifying, using the interrupt handler activation information, that the first processor processes the interrupt of the sensor circuit, and
receiving, by the second processor, the sensor data from the sensor circuit in response to the interrupt signal based on identifying, using the interrupt handler activation information, that the second processor processes the interrupt of the sensor circuit.

12. The method of claim 10, further comprising: controlling the first processor to not respond to the interrupt signal transmitted from the sensor circuit based on identifying, using the interrupt handler activation information, that the first processor does not process the interrupt of the sensor circuit, and
controlling the second processor to not respond to the interrupt signal transmitted from the sensor circuit based on identifying, using the interrupt handler activation information, that the second processor does not process the interrupt of the sensor circuit.

13. The method of claim 10, wherein the determining of whether to process the interrupt signal transmitted from the sensor circuit by the first processor and the second processor in response to the handler activation information comprises:
   controlling the second processor to not process the interrupt of the sensor circuit based on identifying, using the interrupt handler activation information, that the first processor processes the interrupt of the sensor circuit; and
   controlling the first processor to not process the interrupt of the sensor circuit based on identifying, using the interrupt handler activation information, that the second processor processes the interrupt of the sensor circuit.

14. The method of claim 10, wherein the amending of the handler activation information in the memory in response to the current system state of the electronic device comprises:
   amending the handler activation information to cause the first processor to process the interrupt of the sensor circuit based on the system state of the electronic device corresponding to an activated state; or
   amending the handler activation information to cause the second processor to process the interrupt of the sensor circuit based on the system state of the electronic device corresponding to a deactivated state.

15. The method of claim 10, wherein a drive strength of the interrupt signal is variably adjusted based on a number of processors connected to the sensor circuit.

* * * * *